Sept. 4, 1951 G. W. FYLER ET AL 2,566,764

CIRCUIT FOR SHIFTING ALTERNATE FIELDS OF TELEVISION RASTERS

Filed Sept. 3, 1947 2 Sheets-Sheet 1

INVENTOR.
George W. Fyler
Garth J. Heisig

BY Norman L. Mueller
Attorney

Sept. 4, 1951 G. W. FYLER ET AL 2,566,764

CIRCUIT FOR SHIFTING ALTERNATE FIELDS OF TELEVISION RASTERS

Filed Sept. 3, 1947 2 Sheets-Sheet 2

INVENTOR.
George W. Fyler
Garth J. Heisig

BY

Attorney

Patented Sept. 4, 1951 2,566,764

UNITED STATES PATENT OFFICE 2,566,764

CIRCUIT FOR SHIFTING ALTERNATE FIELDS OF TELEVISION RASTERS

George W. Fyler, Lombard, and Garth J. Heisig, Chicago, Ill., assignors to Motorola, Inc., Chicago, Ill., a corporation of Illinois Application September 3, 1947, Serial No. 771,974

3 Claims. (Cl. 178—5.1)

Figure 1:
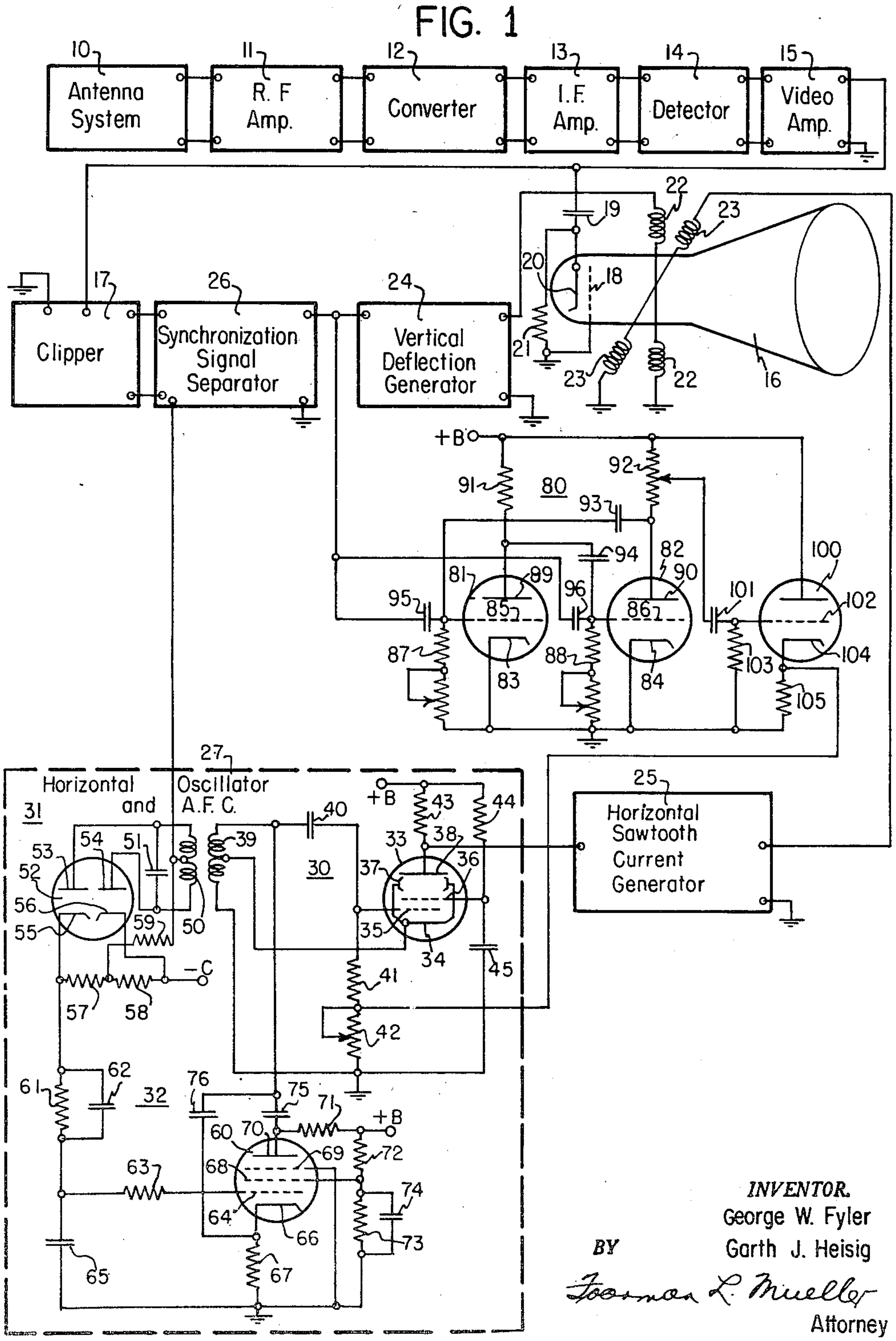

This invention relates generally to television systems and in particular to a system for producing an intelligible image from a video signal which has been distorted to prevent unauthorized reception thereof.

Various systems have been used for distorting or scrambling signals to prevent reception thereof by unauthorized parties. Such systems have been used to prevent reception of confidential matter by unauthorized persons and are commonly used in military equipment. It has also been proposed to use such a system to collect toll or revenue in connection with the reception of radio or television programs. That is, it is desired to prevent parties from receiving various programs without paying toll which would be used for defraying the cost of producing and transmitting the programs and for making profit therefrom. This is of particular importance in connection with television transmission as the cost is quite large.

In order to collect toll from persons desiring to receive various television programs, it has been proposed to transmit the signal in a distorted or scrambled manner so that when reproduced by a standard television receiver the image is not intelligible. One manner in which this is accomplished is to rearrange the positioning of the picture signals and the synchronization pulses so that the successive fields produced by the receiver are displaced with respect to each other. It is then necessary to provide means for unscrambling the picture and it has been proposed to provide a signal which acts as a code to unscramble the signal. This signal may be transmitted over telephone lines so that the time during which the signal is received can be metered and the person receiving the signal can be charged accordingly. This system is objectionable in that it is dependent upon the telephone system and also in that relatively complicated and expensive equipment is required for receiving the line signal and utilizing the same to produce an intelligible image.

It is, therefore, an object of the present invention to provide an improved system for properly reconstructing an image from a distorted or scrambled television video signal.

A further object of this invention is to provide an unscrambling system which utilizes various portions of standard television receivers and does not require line signals or signals from an external source to provide an unscrambling code.

A feature of this invention is the provision of a system for shifting the position of successive fields in a television image so that the fields are aligned and the image is properly reconstructed.

A further feature of this invention is the provision of a square wave generator adapted to be controlled by the synchronization pulses of the receiver and connected to the deflecting means for shifting the position of the picture fields.

A still further feature of this invention is the provision of a multivibrator adapted to provide square wave pulses for shifting the horizontal position of the image on the screen, with the multivibrator being held in synchronism by the vertical synchronization pulses and the shift taking place during the vertical blanking period.

Figure 2:
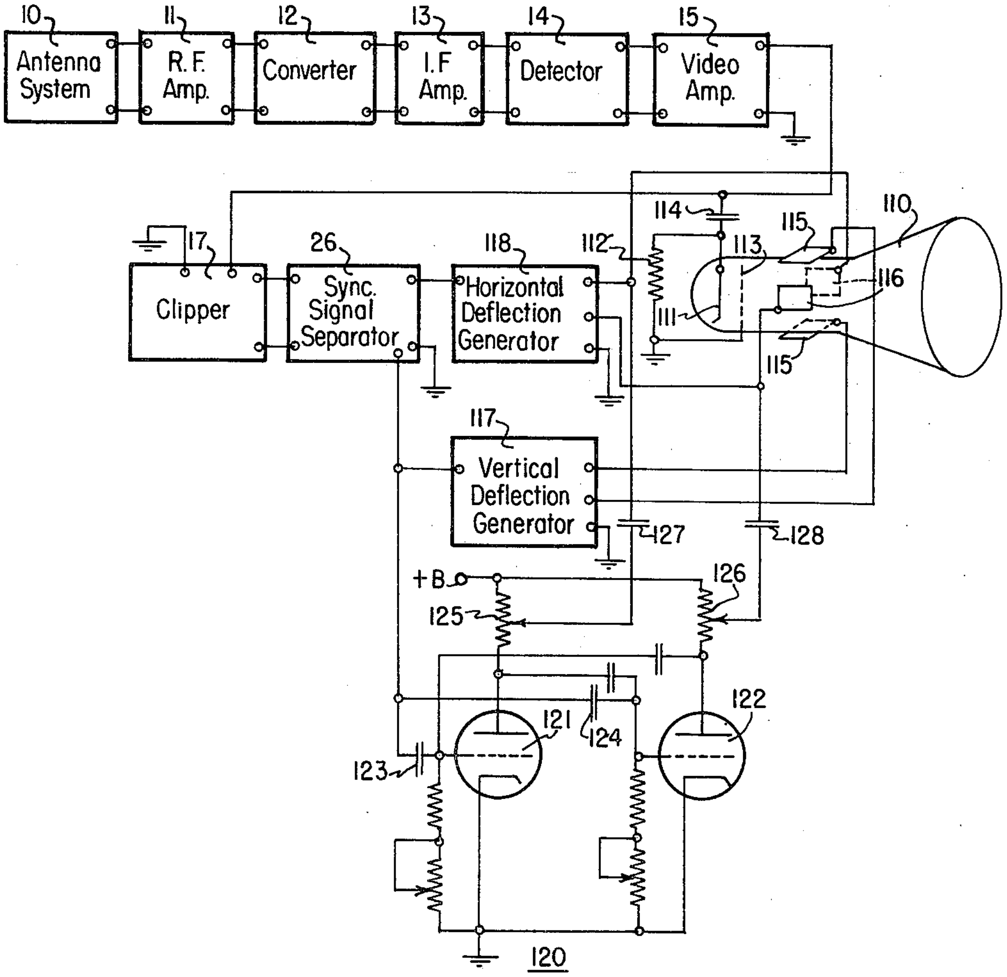

Further objects, features and advantages will be apparent from a consideration of the following description taken in connection with the accompanying drawings in which:

Fig. 1 illustrates an unscrambling system in accordance with the invention as applied to a television receiver using magnetic deflection; and Fig. 2 illustrates the system as applied to a television receiver utilizing electrostatic deflection.

In practicing the invention there is provided a television receiver system including means for shifting the horizontal position of the recurring fields produced by a television receiver to produce an intelligible image from a signal which has been distorted or scrambled. This system is for use in receiving signals which have been distorted so that if received by a standard receiver in the usual manner, the successive fields are displaced first to one side and then to the other and so on so that the fields are not aligned and the image produced thereby is unintelligible. To accomplish this in a standard system in which the fields appear 60 times a second, it is necessary to provide a square wave having a frequency of 30 cycles a second so that the two halves of the 30 cycle square wave shift the field in opposite directions the right amount so that the fields become aligned. The required square wave can be produced by a generator which is synchronized with the vertical synchronization pulses with the output of the generator being applied to the horizontal deflecting means of the receiver for shifting the field.

Referring now to the drawings, in Fig. 1 there is illustrated a receiver utilizing electromagnetic deflection. This receiver includes an antenna system 10 for receiving modulated video signals and applying them to radio frequency amplifier 11 wherein the signals of the desired frequency are selected and amplified. The modulated signal is reduced to an intermediate frequency by converter 12 and further selected and amplified in intermediate frequency amplifier 13. For deriving the video signal from the intermediate frequency signal, detector 14 is provided while applies the signal to video amplifier 15. The amplified signal from the video amplifier is applied to the cathode ray image reproducing tube 16 and to clipper 17 in the usual manner. The sound channel is not illustrated in the system shown but a sound channel can be provided in various well known ways and as the sound channel does not constitute a part of this invention it has not been illustrated.

The image reproducing tube 16 includes a grounded grid 18 and a cathode 20 biased by resistor 21 to which the video signal is applied through condenser 19. For deflecting the electron beam produced by the tube, vertical deflecting coils 22 and horizontal deflecting coils 23 are provided. Sawtooth scanning currents are provided for the vertical and horizontal deflecting coils by the vertical and horizontal sawtooth current generators 24 and 25, respectively. The sawtooth current generators are held in step with synchronization pulses included as a part of the video signal, with the pulses being derived from the video signal by clipper 17 and the vertical or field pulses separated from the horizontal or line pulses by synchronization signal separator 26. The vertical synchronization pulses are applied to the vertical deflection generator and control the same in the usual manner. The horizontal synchronization pulses are applied to horizontal oscillator 27 which excites the horizontal sawtooth current generator 25. The horizontal oscillator 27 includes automatic frequency control means and is further controlled by the means in accordance with the invention as will be explained.

Considering now more specifically the horizontal oscillator and automatic frequency control system 27, it is pointed out that this system includes an oscillator generally indicated at 30, a discriminator generally indicated at 31 and a reactance control system generally indicated at 32. The oscillator is illustrated as being of the Hartley type including a beam tube 33 having a cathode 34, control grid 35, screen grid 36, directing electrodes 37, and plate 38. The feedback circuit for the oscillator includes a coil 39 having a center tap connected to the cathode 34 and being coupled to the grid 35 through condenser 40. The grid 35 is biased by resistors 41 and 42, resistor 42 being variable. Operating potential is applied to the tube 33 from the plus B source through resistor 43 which is connected to the plate 38 and resistor 44 which is connected to the screen grid 36. Condenser 45 provides by-pass for the screen grid 36.

The discriminator 31 is adapted to produce a control voltage which varies in accordance with the difference in phase between the horizontal synchronization pulses and the output of oscillator 30. The horizontal synchronization pulses are applied to the center tap of the coil 50 which is inductively coupled to the coil 39 of the oscillator and through resistor 59 to the common terminal between resistors 57 and 58. For tuning the discriminator circuit a condenser 51 is connected across the coil 50 with the tuned circuit being connected to a pair of diodes included in a tube 52. The plates 53 and 54 of the diodes are connected to the terminals of the coil 50 and the cathodes 55 and 56 are connected to the load resistors 57 and 58, respectively. Cathode 56 is also connected to a source of negative potential indicated as minus C. A control voltage is developed across resistors 57 and 58 when the voltage applied to the coil 50 from the oscillator 30 is not in phase with the synchronization pulses. This voltage is applied to the reactance tube 60 for controlling the reactance thereof through a filter comprising resistor 61 and condenser 62 and through series resistor 63 to the grid 64 of the reactance tube 60. Resistors 61 and 63 and condensers 62 and 65 prevent fast changes in the control voltage applied to the reactance tube. The reactance tube 60 includes a cathode 66 biased by resistor 67, a screen grid 68, a suppressor grid 69 and a plate 70. Operating potential is applied to the tube 60 from the plus B voltage source by resistor 71 connected to plate 70, and through voltage divider including resistors 72 and 73 to the screen grid 68. Condenser 74 provides screen by-pass. The tube 60 is connected to the coil 39 of oscillator 30 through condenser 75, with the tube in effect being shunted by condenser 76. The tube 60 is, therefore, in the frequency determining circuit of the oscillator and controls the frequency thereof. As the reactance of the tube depends on the control voltage applied thereto by discriminator 31, it is seen that the oscillator is controlled by the synchronization pulses and may be held in step therewith.

The oscillator above described is well known in the art and is used in television systems to provide a voltage wave which is synchronized with the horizontal synchronization pulses through the automatic frequency control system so that the lines in the received picture will be synchronized with the transmitter but will not be positively locked with the synchronization pulses to cause tearing of the picture. The oscillator controls the horizontal sawtooth current generator 25 which produces the horizontal scanning current. For shifting the position of successive fields when receiving a signal in which the fields have been displaced with respect to each other, a system is provided for further controlling the horizontal oscillator. This system includes a multivibrator 80 including triode tubes 81 and 82. The tubes 81 and 82 are connected in a standard multivibrator circuit with the cathodes 83 and 84, respectively, grounded and the grids 85 and 86 biased by resistor systems 87 and 88. Each of the resistor systems 87 and 88 includes a fixed and a variable resistor in series so that the bias can be adjusted. The tubes 81 and 82 include plates 89 and 90 connected to voltage source plus B through resistors 91 and 92, respectively. The grid 85 of tube 81 is coupled to the plate 90 of tube 82 by condenser 93 and the grid 86 of tube 82 is coupled to the plate 89 of tube 81 by condenser 94 in a standard multivibrator circuit. By adjusting the grid biases of the tubes the multivibrator can be made to have a free running frequency as desired.

In the present application wherein it is desired to provide pulses of 30 cycle frequency to shift successive fields recurring at 60 cycles in opposite directions, the multivibrator 80 should be adjusted to operate at a frequency of the order of 30 cycles per second. In order to lock the multivibrator with the vertical synchronization pulses the multivibrator should be adjusted to operate slightly slower, that is, at approximately 29 cycles so that each cycle is cut off by a synchronization pulse and the multivibrator is, therefore, held in step. This is accomplished by applying vertical synchronization pulses from the synchronization signal separator 26 through condensers 95 and 96 to the grids 85 and 86, respectively, of the tubes. The voltage wave from the multivibrator is applied to the Hartley oscillator 30 through the triode 100 which functions as a cathode follower. The output from the multivibrator is applied from plate 90 of tube 82 through potentiometer 92 and condenser 101 to the grid 102 of the triode 100. The grid 102 is biased by resistor 103 and the cathode 104 of the triode is biased by resistor 105. The potential appearing across resistor 105 due to the following action of the cathode 104 is applied to the grid 35 of the horizontal oscillator through resistor 41 to shift the phase of the oscillator which in turn shifts the phase of the output current wave of the horizontal sawtooth current generator 25 and controls the horizontal position of the picture field. The amount of shift provided can be controlled by varying the potential applied to the grid 102 of the tube 100 through the potentiometer 92. As the action of the multivibrator is in step with the vertical synchronization pulses, the shifting of the fields will occur between fields so that the shifting action does not appear in the reproduced image.

In Fig. 2 there is illustrated a television receiver utilizing electrostatic deflection to which the unscrambling device, in accordance with the invention, has been applied. In this receiver the antenna system 10, radio frequency amplifier 11, converter 12, intermediate frequency amplifier 13, detector 14, video amplifier 15, clipper 17 and synchronization signal separator 26 may be identical to the corresponding components of Fig. 1 and operate in the same manner. The image reproducing device 110 includes a cathode 111 biased by resistor 112 and coupled to video amplifier 15 through condenser 114. The grid 113 is grounded. For deflecting the electron beam, electrostatic deflecting plates are provided including vertical deflecting plates 115 and horizontal deflecting plates 116. The vertical deflecting plates 115 are connected to vertical deflection generator 117 which applies a sawtooth voltage wave thereto which is held in step with the field synchronization pulses produced by a synchronization signal separator 26. Similarly, horizontal sawtooth voltage waves are applied by the horizontal deflection generator 118 to the deflecting plates 116 with the voltage waves being held in step by the line pulses from the synchronization signal separator 26.

To shift the position of successive picture fields as above described, a multivibrator 120 is provided which may be identical to the multivibrator 80 of Fig. 1. The multivibrator includes tubes 121 and 122 connected in the multivibrator circuit as previously described. The multivibrator is held in step with the vertical pulses applied through condensers 123 and 124 to the grids of tubes 121 and 122, respectively. Operating potentials are applied to the tubes 121 and 122 through potentiometers 125 and 126, respectively, with the potentiometers including movable taps connected to the horizontal deflecting electrodes 116 through coupling condensers 127 and 128, respectively. The square wave output from the multivibrator is, therefore, applied in opposite phase to the two horizontal electrodes to shift the position of successive fields. The amount of potential applied from the multivibrator to the deflecting electrodes depends upon the position of the movable taps on the potentiometers 125 and 126. It is apparent that the amount of shift can be controlled as desired so that the successive fields can be aligned.

It is apparent from the above that in accordance with the invention systems are provided for shifting the successive fields produced in a television receiver so that the fields are aligned and an intelligible image is produced. The system is entirely independent of external control signals and is adaptable to be built directly as a part of a receiver or as an adapter for use with standard receivers. The apparatus required is simple and inexpensive, being particularly simple for receivers using electrostatic deflecting system as a single tube including a pair of triode sections will operate satisfactorily. The system is also readily applicable to a receiver utilizing electromagnetic deflection being particularly applicable in systems wherein automatic frequency control is used in the horizontal oscillator as illustrated in Fig. 1. The system is, however, of general application and is suitable for use in other television receiver circuits as will be apparent to those skilled in the art.

It is to be noted that the unscrambling system in accordance with the invention can be used in connection with a toll system by combining metering means therewith so that the time during which the unscrambling system is used can be recorded. External signals or connection to other communication systems is not required as synchronization of this system is completely controlled by the video signal itself.

While we have disclosed certain embodiments of our invention which are illustrative thereof, it is obvious that various changes and modifications can be made therein without departing from the intended scope of the invention as defined in the appended claims.

We claim:

1. A television receiver for reproducing an image from a composite video signal including picture elements interspersed with field and line synchronizing pulses, including in combination, means including a cathode ray tube for producing a beam varying in intensity with the picture elements of the video signal, means for scanning the beam in a vertical direction in accordance with the field synchronizing pulses to produce successive picture fields, means including an oscillator for scanning the beam in a horizontal direction in accordance with said line synchronizing pulses to provide picture lines, and means for providing a shift of the horizontal position of the beam with alternate fields, said shift producing means including a generator for producing symmetrical square waves, means for synchronizing said generator with said field synchronizing pulses, and means for applying the output of said generator to said horizontal scanning oscillator for shifting the horizontal position of said picture lines, said square wave generator operating at half the frequency of said field synchronization pulses to thereby shift alternate picture fields with respect to each other.

2. A television receiver including the combination set forth in claim 1 in which said horizontal and vertical scanning means includes deflection coils and means for providing currents of sawtooth wave form thereto, and said horizontal scanning oscillator includes a frequency controlling circuit to which said square wave output of said generator is applied.

3. A television receiver including the combination set forth in claim 1 in which said horizontal and vertical scanning means include horizontal and vertical deflecting plates and said horizontal scanning oscillator is connected to said horizontal deflecting plates, with said square wave from said generator being applied to the output of said horizontal scanning oscillator at said horizontal deflecting plates.

GEORGE W. FYLER.
GARTH J. HEISIG.

REFERENCES CITED

The following references are of record in the file of this patent:

UNITED STATES PATENTS

| Number | Name | Date |
|---|---|---|
| 2,251,525 | Rosenthal | Aug. 5, 1941 |
| 2,307,188 | Bedford | Jan. 5, 1943 |
| 2,389,646 | Sleeper | Nov. 27, 1945 |
| 2,402,067 | Mathes | June 11, 1946 |
| 2,436,516 | Larson et al. | Feb. 24, 1948 |
| 2,510,046 | Ellett et al. | May 30, 1950 |